United States Patent [19]

Clark et al.

[11] Patent Number: 4,902,481
[45] Date of Patent: Feb. 20, 1990

[54] MULTI-WELL FILTRATION TEST APPARATUS

[75] Inventors: Phillip Clark, Malden; Carolyn Lee, Sudbury; Donald B. Rising, Stow; Thomas Zermani, Concord, all of Mass.

[73] Assignee: Millipore Corporation, Bedford, Mass.

[21] Appl. No.: 131,952

[22] Filed: Dec. 11, 1987

[51] Int. Cl.⁴ .................. B01D 25/02; B01L 3/00; C12M 1/12; C12M 1/20
[52] U.S. Cl. ........................... 422/101; 210/335; 210/492; 422/102; 435/305
[58] Field of Search ............... 422/101, 102; 435/305; 210/335, 489, 492, 321.72

[56] References Cited

U.S. PATENT DOCUMENTS

| | | |
|---|---|---|
| 4,734,192 | 3/1988 | Champion et al. ............. 422/101 X |
| 4,734,262 | 3/1988 | Bagshawe ......................... 422/101 |
| 4,787,988 | 11/1988 | Bertoncini et al. ............. 422/101 X |
| 4,797,259 | 1/1989 | Matkovich et al. ................. 422/101 |

Primary Examiner—Barry S. Richman
Assistant Examiner—Jill Johnston
Attorney, Agent, or Firm—Andrew T. Karnakis; Paul J. Cook

[57] ABSTRACT

A multi-well filtration apparatus for the assay of microliter quantities is provided wherein a filter is positioned in each well on a plate having an open spout positioned in the plate. The spout has a collar on its outer surface extending in a direction perpendicular to the vertical axis of the spout. The collar prevents a liquid droplet from climbing the outer surface of the spout from its open end.

8 Claims, 3 Drawing Sheets

MULTI-WELL FILTRATION TEST APPARATUS

BACKGROUND OF THE INVENTION

This invention relates to laboratory apparatus useful in the assay of biological and biochemical reactants and is particularly concerned with multi-well filtration devices capable of retaining liquids for substantial periods of time prior to performing filtration.

Test plates for in vitro analysis which contain a multiplicity of individual wells or reaction chambers are commonly known laboratory tools. Such devices have been employed for a wide variety of purposes and assays as exemplified by U.S. Pat. Nos. 3,694,464; 4,304,865; 4,276,048; 4,154,795; 4,427,415; 4,526,690 and Re. 30,562. Microporous membrane filters and filtration devices containing such microporous membranes have become especially useful with many of the recently developed cell and tissue culture techniques and assays, particularly those in the field of virology and immunology. Typically a 96-well filtration plate is used to conduct multiple assays simultaneously some steps of which last several hours prior to performing filtration. With such filtration plates, especially those containing microporous membranes, there is a well recognized and recurrent problem in that liquid in the wells tends to pass through the membrane by capillary action and gravity flow thereby causing a loss of contents from within the reaction well. Before the desired stage in the experimental design, prevention of liquid loss by capillary action and gravity flow becomes especially important when living cells or tissues are being maintained or grown within the reaction wells. Under these circumstances, favorable media conditions for the cells or tissues must be maintained for hours or even days and any loss of liquid from the wells, however small, will affect the condition of the cells and influence the results of the assay. Prevention of liquid loss through the membrane in this manner is also vitally important when the assay utilizes very small sample volumes as reactant, such test samples often being less than 100 microliters in volume. The pendant drop that invariably forms on the underside of the membrane due to such capillary action and gravity flow is typically about 50 microliters in volume and it is apparent that a liquid loss of such proportions must drastically affect the assay.

In many instances, the test design involves a step of recovering the liquid from the well so the liquid can be analyzed. A common problem with prior art apparatus is that drops from adjacent wells often merge during the filtration step thereby cross-contaminating the samples. In addition, large pendant drops may remain attached to the underside of the membrane structure thereby giving variable sample transfer. Furthermore, in some prior art devices, porous hydrophobic surfaces are utilized and air passing through the hydrophobic areas can disturb and scatter the pendant drops so that liquid from the well is not recovered in the designated recovery well. Accordingly, it would be desirable to provide a multi-well filtration plate which permits conducting tests having varying incubation times and which permits recovery of liquid separately from each well so the liquid can be analyzed, if desired.

SUMMARY OF THE INVENTION

This invention provides a single or multi-well filtration apparatus suitable for the assay of microliter quantity of biological and biochemical materials. The filtration apparatus includes a plate having a plurality of wells, open at one end and having a filtration membrane positioned across an opposing end. A second plate is provided having a second set of wells which register with the wells of the first plate. The second wells include a small opening having a spout which opening and spout are adapted to receive liquid passing through the membrane. The size of the opening and spout are controlled so that liquid is retained in the first wells under normal atmospheric conditions due to surface tension forces but passes therethrough when a differential pressure is applied to the filtration apparatus. The size and shape of the spout is controlled so that liquid emerging from the hole and spout does not move across the underside of the second well but rather drops into a receptacle positioned beneath the opening and spout. The spout openings have an inner diameter between 0.1 and 3.0 mm and "smallest outer diameter" between 0.1 and 5.0 mm. A collar positioned on the spout outer diameter extends in a direction substantially perpendicular to the spout vertical axis which collar prevents liquid from climbing the spout outer diameter. The collar has an outer diameter between about 0.5 and 7 mm. The liquid in each of the wells is maintained separate from liquid in any other well.

DETAILED DESCRIPTION OF SPECIFIC EMBODIMENTS

This invention provides an improved multi-well filtration apparatus which permits the retention of liquid in the wells during a desired incubation period followed by removal of the liquid from each well by filtration with a vacuum or under pressure. The filtrate from each well is recovered separately from the filtrate of the other wells. Thus, this apparatus permits the analysis of retentate and/or filtrate without cross contamination between wells.

Figure 1:
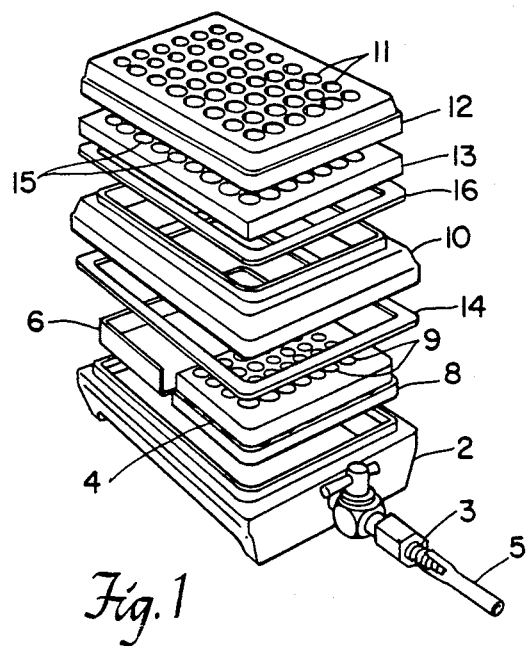
FIG. 1 is an expanded view of a vacuum assembly useful with the present invention.

Referring to FIG. 1, a vacuum assembly is shown capable of simultaneously processing a plurality of test samples of a size usually up to about 400 microliters each. The vacuum assembly comprises a base 2 which acts as a vacuum chamber and contains hose barb 3 for connection to a regulated external vacuum source through hose 5. Positioned within the base 2 are liquid collection means 4 which includes a collection tray 6 and/or a receiving plate 8 having a plurality of individual chambers 9 for collecting filtrate. The individual chambers 9 are associated each with a single well 11 in filtration plate 12. A second plate 13 is provided containing a plurality of wells 15. Plate 13 is snap or press fit with plate 12 in a manner described in more detail below. A plate support 10 holding the filtration plate 12 above the fluid collection means 4 is separated by gaskets 14 and 16 which form an airtight seal in the presence of a vacuum force exerted through hose 5. Alternatively, plate support 10 could hold and form a seal with plate 13.

Figure 2:
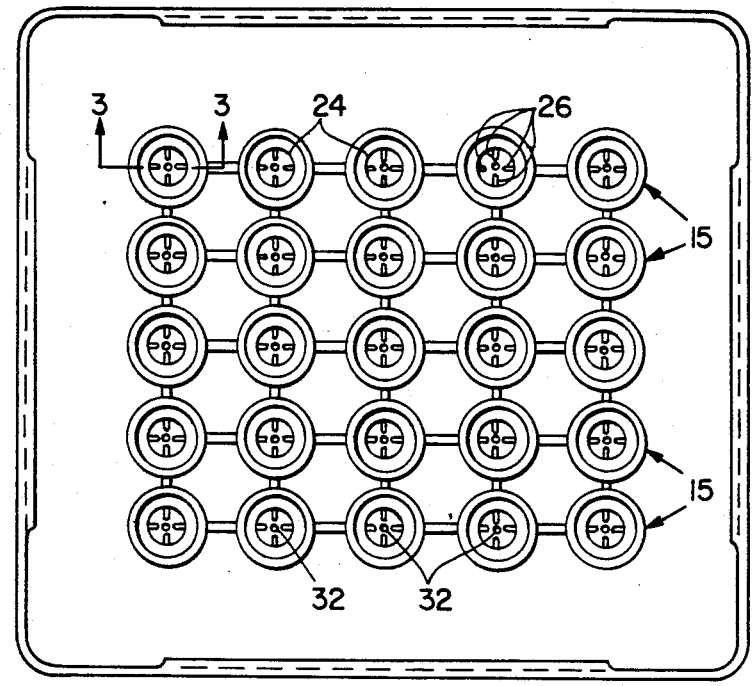
FIG. 2 is a top view of a filtration apparatus comprising a second plate portion of this apparatus.
Figure 3:
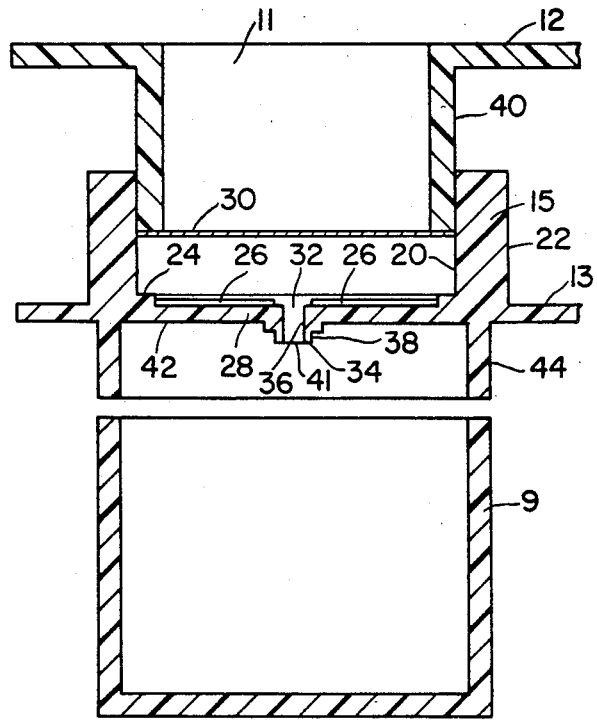
FIG. 3 is a cross sectional view of the apparatus of this invention, shown partially assembled.

Referring to FIG. 2 and 3, plate 13 includes a plurality of wells 15. Each well 15 includes an inner peripheral surface 20 and an outer peripheral surface 22. At the bottom of each well 15 a sheet 24 is provided which extends about the inner peripheral surface 20. Ribs 26 are provided on the bottom plate 28 so that when membrane 30 is positioned on shelf 24 and ribs 26 it is maintained out of contact with plate 28 thereby enhancing filtration over substantially the entire surface of membrane 30. A hole 32 extends through plate 28 and a spout 34 having an inner peripheral surface 36 and an outer peripheral surface 38 extending downwardly from hole 32. Plate 13 is snap or press fit into plate 12 by virtue of the frictional forces between inner peripheral surface 20 of well 15 and outer peripheral surface 40 of well 11. Well 11 extends downwardly to the point such that membrane 30 contacts shelf 24 and ribs 26. A receptacle 9 is positioned beneath each pair of well plates 12 and 13 such that the liquid emanating from spout 34 is directed into the receptacle 9 without migrating to other receptacles associated with other wells.

The filtration membrane 30 can be bonded to plate 12 or can be held in position merely by being compressed between plates 12 and 13. Any conventional bonding method can be utilized when the membrane is bonded to plate 12. Representative suitable microporous membranes include nitrocellulose, cellulose acetate, polycarbonate and polyvinylidene fluoride microporous membranes. Alternatively, the membrane can comprise an ultrafiltration membrane, which membranes are useful for retaining molecules as small as about 100 daltons and generally molecules as large as about 2,000,000 daltons. Examples of such ultrafiltration membranes include polysulfone, polyvinylidene fluoride or cellulose or the like. Also, the membrane can be comprised of depth filter media such as paper or glass fibers.

In accordance with this invention, it has been found that the design of the spout 34 is very important in order to retain liquid in the well of the filtration plate during incubation and further to prevent undesirable migration of liquid emanating from the spout. Where the surface tension of the liquid in the well is greater than the surface energy of the spout material, it would be expected that the inner diameter of the spout is important relative to the height of the liquid in the well in order to retain that liquid during incubation. It has been found that due to the small dimensions involved and to the presence often of surfactants in the liquid, the outside diameter of the spout must instead be limited. For example, when a well is filled with an aqueous sample with an upper surface 1.0 centimeters above the lowermost end 41 of the spout, the diameter of the outside surface 38 of the spout should be less than about 3.0 millimeters and preferably less than 1.5 millimeters. Furthermore the geometry of the outside of the spout is important to prevent liquid which emanates from the spout 34 during vacuum filtration from climbing the outside surface 38 of the spout 34 and then spreading along the bottom surface 42 of plate 13. Such climbing and spreading is undesirable as it increases the size of any pendant drop and also increases the possibility that the contents of one well will be transferred to a receptacle other than the receptacle 9 positioned just below a given spout 34. This undesirable spreading is further prevented by means of a wall 44 which surrounds spout 34. Wall 44 generally has a length between 0.1 and 2 millimeters. The outer surface of the spout is provided with a collar which extends in a direction substantially perpendicular to the vertical axis of the spout. The collar functions to block the climb of liquid along the outer spout surface 38 in a direction toward the bottom surface of well 15. The spout has a length, as measured from the bottom surface 42 of bottom plate 28 of at least 0.2 millimeters, usually up to about 5 millimeters.

Figure 5:
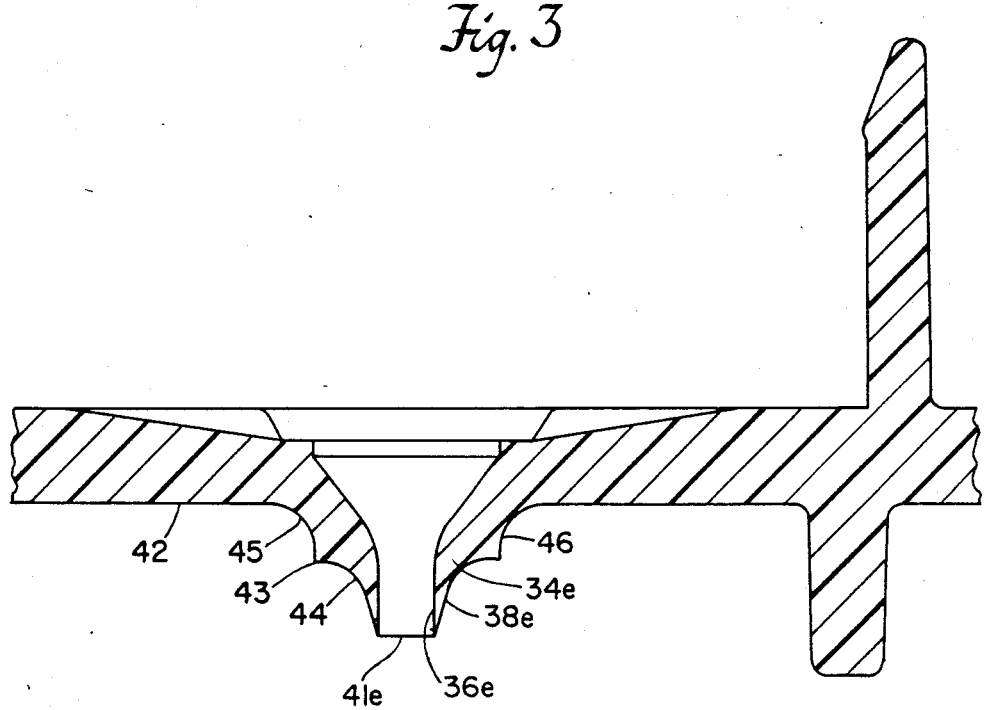
FIG. 5 is a cross sectional view of an alternative design of the spout of this invention.
Figure 4:
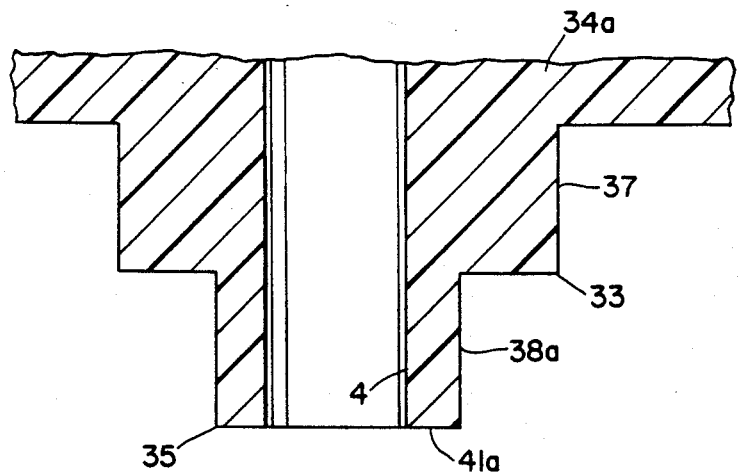
FIG. 4 is a cross sectional view of one spout design of this invention.

Referring to FIG. 4, the spout 34a has an outer surface 38a, which is preferably smooth and free of surface irregularities, and which forms a sharp corner at its intersection with the lowermost surface 41a, all the above being useful in preventing undesirable droplet migration. The collar 37 further prevents undesirable droplet migration in the event that droplet should wet surface 38a due to vibration or other cause. The larger diameter of the collar 37 makes the angle formed between the droplet and surface 37 less favorable for further wetting. The surface 38a should extend below the collar 37 by at least half the diameter of the collar 37 to ensure that edge 35 will protrude through the surface of a residual droplet and thus allow the diameter of surface 38a to determine the height of liquid which can be retained in the well above. Again, performance is enhanced when surface 38a is smooth and edges 33 and 35 are sharp. In FIG. 5, a collar 46 is joined to surface 38e by smooth curve 44 which prevents liquid from being retained in the corner otherwise created by the intersection of surface 38e, and collar 46. The smooth curve 44 also improves the suitability of the design for molding, as does smooth curve 45 which joins the bottom surface 42 of the plate. The surface 38e also permits the outside diameter of the spout at its lowermost end at surface 41e to be nearly as small as the inside diameter 36e of the spout, thus permitting the spout to retain a greater head of liquid for a given inside diameter. As before edge 43 preferably is sharp and positioned above end surface 41e by at least half the diameter at end surface 41e.

Figure 6:
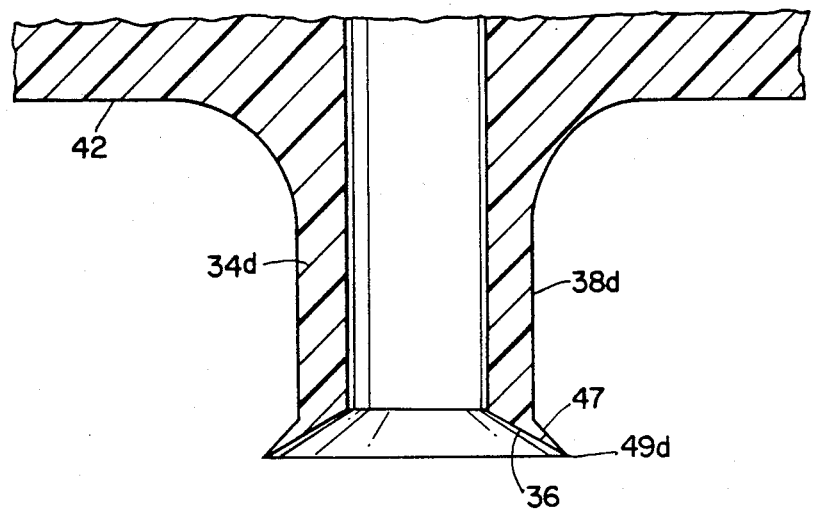
FIG. 6 is a cross sectional view of an alternative spout design of this invention.

Referring to FIG. 6 an enlargement 47 at the lower end of spout 34d is added to reduce undesirable wetting of the outer surface 38d by a droplet. The diameter of edge 49d will determine the head of liquid which can be retained in the well. The edge 49d preferably is sharp as described above. The upper surface of enlargement 47 preferably is horizontal or nearly so, but any angle up to about 60 degrees from horizontal improves performance.

Performance of all of the above designs is enhanced when the plate 13 is made of a material having a low surface energy such as polytetrafluoroethylene or when at least the spouts and the underside of the plate are coated with a material having a low surface energy.

We claim:
1. A filtration apparatus comprising
a first plate having at least one first well, each of said first wells having a first open end, a second end and an outside peripheral surface,
a second plate having at least one second well having a first open end, a second closed end, said closed end having a hole extending through the closed end thickness and an inside peripheral surface,
said second plate being secured to said first plate between said outside peripheral surface of said first plate and said inside peripheral surface of said second plate, a filter, positioned between said second end of said first plate and said second end of said second plate, and an open spout having an open end, said spout being in fluid communication with said hole, said spout having an inner diameter between 0.1 and 3.0 mm and a smallest outer diameter between 0.1 and 5.0 mm., and a collar on the outer surface of said spout extending in a direction substantially perpendicular to the vertical axis of said spout, said spout outer surface and said collar in combination forming a larger outer surface of said spout of varying diameter which functions to prevent migration of liquid emanating from said spout along said larger outer surface, said collar having an outer diameter between 0.5 and 7 mm.

2. The apparatus of claim 1 wherein said filter is a microporous membrane.

3. The apparatus of claim 1 wherein said filter is an ultrafiltration membrane.

4. The apparatus of claim 1 wherein said filter is a depth filter.

5. The apparatus of any one of claims 1, 2, 3, or 4 wherein said spout has an outer diameter tapered toward said inner diameter at an angle between about 5 degrees and 70 degrees.

6. The apparatus of any one of claims 1, 2, 3, or 4 wherein said first plate and said second plate are secured together by mechanical interlocking.

7. The apparatus of any one of claims 1, 2, 3, or 4 wherein said first plate and said second plate are secured together by thermal bonding.

8. The apparatus of any one of claims 1, 2, 3, or 4 wherein said first plate and said second plate are secured together by adhesive bonding.

* * * * *